United States Patent
Choudhary et al.

(10) Patent No.: US 12,032,988 B2
(45) Date of Patent: *Jul. 9, 2024

(54) VIRTUAL MACHINE OPERATION MANAGEMENT IN COMPUTING DEVICES

(71) Applicant: MICROSOFT TECHNOLOGY LICENSING, LLC, Redmond, WA (US)

(72) Inventors: Ojasvi Choudhary, Seattle, WA (US); Tristan Anthony Brown, Seattle, WA (US); Alok Gautam Kumbhare, Redmond, WA (US); Ricardo Gouvêa Bianchini, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,448

(22) Filed: Jul. 19, 2022

(65) Prior Publication Data
US 2023/0015908 A1 Jan. 19, 2023

Related U.S. Application Data

(63) Continuation of application No. 16/600,907, filed on Oct. 14, 2019, now Pat. No. 11,422,842.

(51) Int. Cl.
*G06F 9/455* (2018.01)
*G06F 9/48* (2006.01)
(Continued)

(52) U.S. Cl.
CPC .......... *G06F 9/45558* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/4557;
(Continued)

(56) References Cited

U.S. PATENT DOCUMENTS

2009/0132840 A1* 5/2009 Talwar ................ G06F 9/45558
713/340
2010/0153761 A1* 6/2010 Nishioka ............. G06F 11/3423
713/323

(Continued)

OTHER PUBLICATIONS

Stoess et al, "Energy Management for Hypervisor-Based Virtual Machines", In Proceedings of the USENIX Annual Technical Conference, Jun. 17, 2007, pp. 1-14 (Year: 2007).*

*Primary Examiner* — Charles M Swift
(74) *Attorney, Agent, or Firm* — Newport IP, LLC; Jacob P. Rohwer

(57) ABSTRACT

Techniques of virtual machine operation management are disclosed herein. In one embodiment, a technique includes determining an operating parameter to be set for executing any processes for a virtual machine with a CPU on a server upon detecting that a process corresponding to the virtual machine hosted on the server is assigned and scheduled to be executed by a processor of the CPU. The technique can then include programming the processor of the CPU assigned to execute the process according to the operating parameter in the accessed parameter record. Upon completion of programing the one of the multiple processors, the process corresponding to the virtual machine can be executed with the processor of the CPU to achieve a target performance level associated with the virtual machine.

20 Claims, 11 Drawing Sheets

(51) Int. Cl.
*G06F 9/50* (2006.01)
*H04L 41/50* (2022.01)
*H04L 41/5019* (2022.01)
*H04L 41/5022* (2022.01)

(52) U.S. Cl.
CPC .............. *G06F 9/48* (2013.01); *G06F 9/4806* (2013.01); *G06F 9/4843* (2013.01); *G06F 9/4881* (2013.01); *G06F 9/4893* (2013.01); *G06F 9/50* (2013.01); *G06F 9/5005* (2013.01); *G06F 9/5022* (2013.01); *G06F 9/5027* (2013.01); *G06F 9/5044* (2013.01); *G06F 9/5077* (2013.01); *G06F 9/5094* (2013.01); *H04L 41/50* (2013.01); *H04L 41/5019* (2013.01); *H04L 41/5022* (2013.01); *G06F 2009/4557* (2013.01); *G06F 2009/45575* (2013.01); *G06F 2009/45579* (2013.01); *G06F 2009/45583* (2013.01); *G06F 2009/45591* (2013.01); *G06F 2009/45595* (2013.01)

(58) Field of Classification Search
CPC . G06F 2009/45575; G06F 2009/45579; G06F 2009/45583; G06F 2009/45591; G06F 2009/45598; G06F 9/48; G06F 9/4806; G06F 9/4843; G06F 9/4881; G06F 9/4883; G06F 9/50; G06F 9/5005; G06F 9/5022; G06F 9/5027; G06F 9/5044; G06F 9/5077; G06F 9/5094; H04L 41/50; H04L 41/5019; H04L 41/5022
See application file for complete search history.

(56) References Cited

U.S. PATENT DOCUMENTS

2010/0192149 A1* 7/2010 Lathrop .................. G06F 1/329
  718/1
2013/0155045 A1* 6/2013 Khodorkovsky ..... G06F 1/3206
  345/212
2017/0090962 A1* 3/2017 Li ....................... G06F 9/45558
2019/0041967 A1* 2/2019 Ananthakrishnan ........................
  G06F 1/3243

* cited by examiner

VIRTUAL MACHINE OPERATION MANAGEMENT IN COMPUTING DEVICES

CROSS-REFERENCE TO RELATED APPLICATION

This application is a continuation of U.S. patent application Ser. No. 16/600,907, filed Oct. 14, 2019, the content of which application is hereby expressly incorporated herein by reference in its entirety.

BACKGROUND

In computing, a virtual machine ("VM") is an emulation of a physical computing system using computer software. A host machine, such as a server, can accommodate multiple virtual machines with different operating systems on the same server. During operation, a virtual machine manager or "hypervisor" can manage sharing of compute, memory, storage, and network resources on the server to the multiple virtual machines. For example, the hypervisor can allocate blocks of physical memory to each of the virtual machines as corresponding virtual memory. By deploying the multiple virtual machines on a single server, various computing resources on the server can be utilized to simultaneously provide computing services to multiple users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Large distributed computing systems, such as datacenters, can have thousands or even millions of servers individually hosting one or more virtual machines for providing cloud or other computing services to users. Typically, computing capacities of datacenters can be sized to accommodate peak loads of usage demand. However, datacenters typically operate at normal loads that are much less than peak loads. As such, the extra computing capacity in datacenters can stay idle most of the time and thus becoming a waste. To improve utilization of computing capacities in datacenters, servers and associated power distribution units, transformers, circuit breakers, and/or other electrical components may be oversubscribed such that the datacenters can support simultaneous usage demand from some users but not all users.

The foregoing oversubscription technique, however, involve risks of service interruptions when datacenters experience peak loads of usage demand. For instance, when all or a large number of users request usage at the same time, some of the users may experience service slowdown or even failure. To accommodate peak loads of usage demand, datacenters can either add spare capacities or limit power consumption and/or performance of existing servers (commonly referred to as "throttling"). Adding spare capacities are typically not instantaneous and can require significant amounts of engineering, construction, installation, commissioning, and/or other types of efforts. As such, datacenters typically throttle power consumption and/or performance of existing servers when experiencing peak loads of usage demand. Example techniques of throttling servers include reducing power consumptions and/or reducing operating frequencies of processors on servers such that a total usage level of electrical and/or computing capacities of the servers are below a threshold.

Throttling servers, however, can degrade user experience of certain computing services provided by the servers. In datacenters, a server can typically host multiple virtual machines executing different processes corresponding to different users simultaneously. Some users may have higher service level guaranties such as lower latency, higher service availability, etc., of computing services than others. Throttling an entire server can thus indiscriminately reduce performance of computing services provided by the server to all users, and thus violate service level guaranties of some users.

Also, some processes can be more sensitive to throttling than others with respect to user experience. On a server, some virtual machines can execute processes for video streaming, voice-over-IP conferencing, web-based collaboration, or other types of client facing services. Other virtual machines can execute other processes to provide virus scanning, software patching, software maintenance, or other background services. Client facing services can be more sensitive to throttling than background services because the effects of throttling the background services may not be as noticeable to users as throttling the client facing services. As such, throttling an entire server may needlessly degrade user experience of the computing services provided by the server.

One solution to address the foregoing difficulty can be to throttle power consumption and/or performance of individual virtual machines on a server. However, such throttling may not be as straight forward as throttling a server. Operations performed by virtual machines may use both virtual computing resources assigned to the virtual machines as well as computing resources accessible by the hypervisor and/or other components of the server. As such, power consumption and/or performance of virtual machines may be difficult to monitor, track, and adjust.

Several embodiments of the disclosed technology can address certain aspects of the foregoing difficulties by implementing a processor controller that is configured to manage operations of virtual machines on a server. In particular, the processor controller can be configured to dynamically adjust operating parameters of physical processors on a server based on profiles of virtual machines whose processes the physical processors are assigned to execute. The process controller can be a part of the hypervisor of the server, a part of an operating system of the server, a standalone application, or can have other suitable arrangements.

In certain embodiments, the processor controller can include an execution monitor operatively coupled to a processor programmer. The execution monitor can be configured to receive a notification from an execution scheduler in the hypervisor or an operating system of the server regarding a process that is assigned to be executed by a physical processor on the server for a virtual machine. Upon receiving the notification, the execution monitor can be configured to retrieve, for instance from a datastore, a parameter record corresponding to the virtual machine whose process is to be executed by the physical processor. The parameter record can include data indicating a power level, an operating frequency, a clock speed, L1/L2/L3 level cache usage, floating point operations per second, or other suitable operating parameters based on certain target operating characteristics of the physical processor corresponding to the virtual machine. In certain implementations, an analyzer that is separate from the processor controller can be configured to generate the parameter record based on, inter alia, VM information of the virtual machine and system information of the server. Example VM information can include a service level agreement or a subscription level of a user corresponding to the virtual machine, a priority of the virtual machine, whether the process is configured to provide a client facing service or background service, or other suitable information. Example server information can include a type/model of the processor, operating frequencies of the processor, available L1/L2/L3 level cache on the processor, and/or other information regarding the processor and other components on the server. In other implementations, the analyzer can be incorporated into the processor controller and be configured to generate the parameter record on an ad hoc or other suitable basis. In further implementations, the parameter record can be generated via machine learning, manual configuration, and/or other suitable techniques. In yet further implementations, data included in the parameter record can include an operating parameter that is different than the target operating characteristics. For instance, the operating parameter can be an operating frequency that is selected to achieve a target power consumption in the physical processor. Upon receiving the parameter record, the execution monitor can then provide the data in the parameter record to the processor programmer and instruct the processor programmer to adjust operating parameters of the physical processor assigned to execute the process accordingly.

In response to receiving the instruction from the execution monitor, the processor programmer can be configured to program the assigned physical processor on the server based on data in the retrieved parameter record. In one implementation, the processor programmer can be configured to transmit an instruction to a control unit ("CU") of the CPU with a suitable command to set an operating parameter of the physical processor. For example, the processor programmer can transmit a command to increase or decrease an operating frequency of the physical processor to a preset level. In turn, the CU can direct operation of the physical processor by, for instance, controlling an arithmetic and logic unit, data input/output, and/or other components on or external to the physical processor how to respond to instructions of the process sent to the physical processor. Upon completion of programing the assigned physical processor, the processor programmer can transmit an instruction to the hypervisor, the operating system, the CU of the CPU, or other suitable components of the server to initiate execution of the process by the physical processor for the virtual machine.

Subsequent to executing the process by the physical processor for the virtual machine, the execution monitor can be configured to receive a new notification from the execution scheduler regarding a new process to be assigned to the same physical processor for execution for another virtual machine on the server. In response, the execution monitor can be configured to retrieve a new parameter record corresponding to the other virtual machine and instruct the processor programmer to reprogram the same physical processor accordingly before allowing execution of the new process, as described above. As such, the same physical processor can be operating at different performance, power, or other suitable types of operating levels at different times in accordance with the profiles of different virtual machines for executing processes of the different virtual machines.

Alternately, subsequent to executing the process by the physical processor for the virtual machine, the execution monitor can be configured to receive a new notification from the execution scheduler regarding a new process to be assigned to another physical processor for execution for the same virtual machine on the server. In response, the execution monitor can be configured to retrieve the same parameter record corresponding to the virtual machine and instruct the processor programmer to program the other physical processor accordingly before allowing execution of the new process on the other physical processor. As such, execution of processes for the same virtual machine can be at a corresponding performance, power, or other suitable types of operating level at different times in accordance with the profiles of virtual machine.

Several embodiments of the disclosed technology can thus effectively achieve performance and/or power consumption control of one or more virtual machines on a server. By programming a physical processor with operating parameters corresponding to a virtual machine whose process is to be executed by the physical processor, power consumption and/or computing performance of the individual virtual machines can be controlled at target levels. In some scenarios, the server can allow all virtual machines to operate at full performance and/or power levels until the server received a notification to throttle power consumption and/or performance from a system controller (e.g., a cluster controller, a fabric controller, a datacenter controller, etc.). In response, the server can throttle execution of processes for some virtual machines based on corresponding parameter records but not others. As such, by preferentially throttling power consumption and/or performance of different virtual machines, processes for client facing services may be preferentially executed to reduce noticeable service interruption to users. As a result, user experience of computing services provided by the server may be improved. In other scenarios, the server can be configured to throttle select virtual machines based on service level agreements, priorities, or other suitable profiles of corresponding users in addition to or in lieu of the notification to throttle from the system controller.

DETAILED DESCRIPTION

Figure 1:
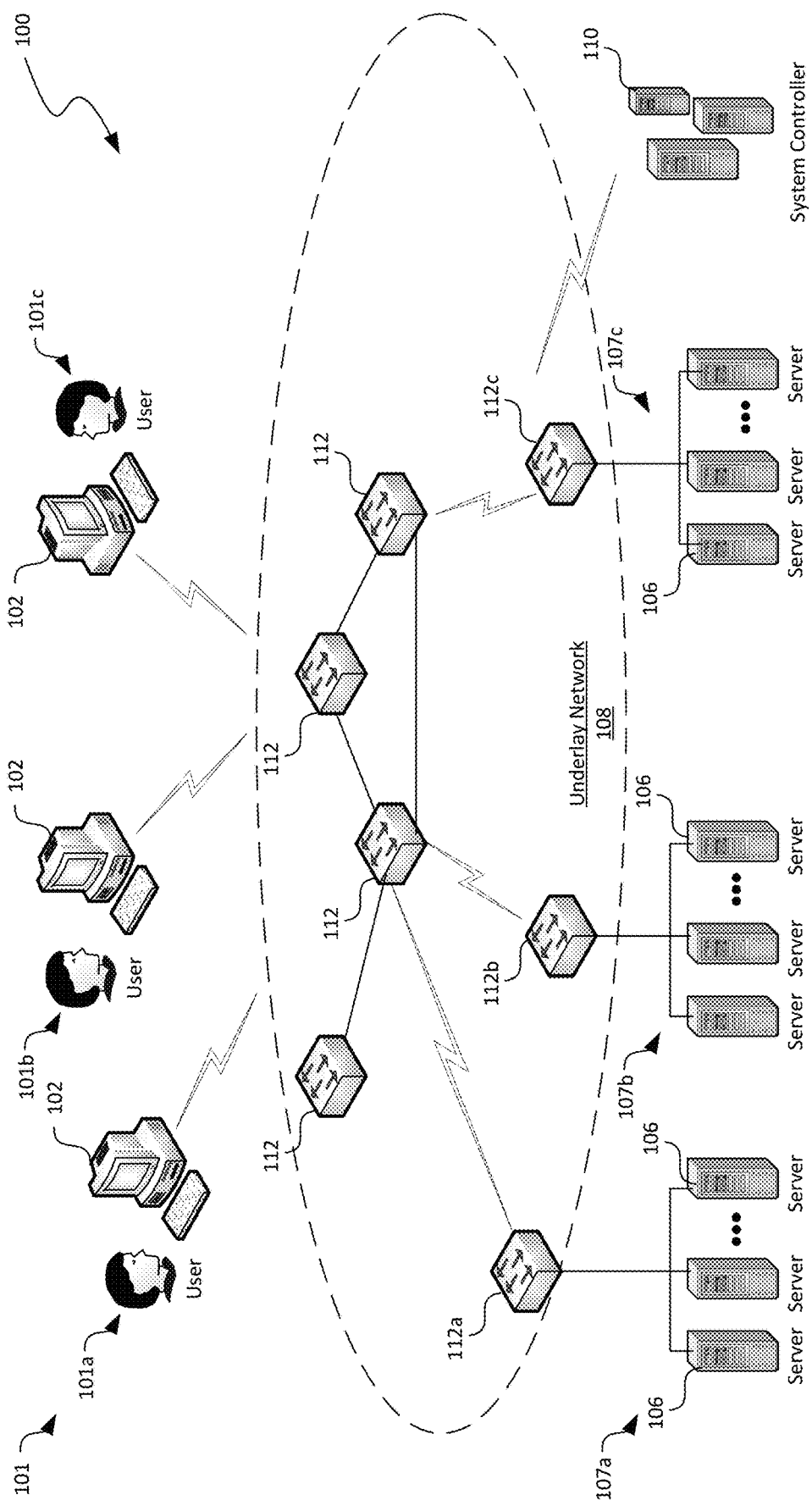
FIG. 1 is a schematic diagram illustrating a distributed computing system implementing virtual machine operation management in accordance with embodiments of the disclosed technology.

Certain embodiments of systems, devices, components, modules, routines, data structures, and processes for implementing virtual machine operation management for achieving a target power consumption or performance level for individual virtual machines are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-7.

As used herein, the term a "distributed computing system" generally refers to a computing facility having a computer network interconnecting a plurality of host machines to one another or to external networks (e.g., the Internet). A compute network can include a plurality of network devices. The term "network device" generally refers to a physical network device, examples of which include routers, switches, hubs, bridges, load balancers, security gateways, or firewalls. A "host machine" can be a server or other suitable types of computing device that is configured to provide a hypervisor that supports one or more virtual machines, virtual switches, or other suitable types of virtual components.

As used herein, a "hypervisor" generally refers to computer software, firmware, and/or hardware that creates, manages, and runs one or more virtual machines on a host machine. A "virtual machine" or "VM" is an emulation of a physical computing system using computer software. Different virtual machines can be configured to provide suitable computing environment to execute different processes for the same or different users on a single host machine. During operation, a hypervisor on the host machine can present different virtual machines with a virtual operating platform to hardware resources on the host machine and manages execution of various processes for the virtual machines.

As used herein, a "process" generally refers to an instance of a computer program that is being executed by one or more physical processors to provide an execution context of a virtual machine or other suitable components in a computing system. A process can contain program code and corresponding activity data. Depending on a profile of operating system on a host machine, a process may be split into multiple constituents called "threads" to be executed concurrently by different physical processors. While a computer program is a collection of instructions, a process is an execution of such instructions. A computer program may be associated with one or more processes. For example, initiating multiple instances of the same computer program can result in multiple processes being executed.

Also used herein, the term "main processor" or Central Processing Unit ("CPU") generally refers to an electronic package containing various components configured to perform arithmetic, logical, control, and/or input/output operations. The electronic package can include one or more "cores" or physical processors configured to execute machine instructions corresponding to processes. The cores can individually include one or more arithmetic logic units, floating-point units, L1 and L2 cache, and/or other suitable components. The electronic package can also include one or more peripheral components such as a control unit ("CU") that is configured to facilitate operations of the cores. The peripheral components can also include, for example, QuickPath® Interconnect controllers, L3 cache, snoop agent pipeline, and/or other suitable components. In the descriptions herein, L1, L2, and L3 cache are collectively referred to as "processor cache."

Also used herein, the term "computing service" or "cloud service" generally refers to one or more computing resources provided over a computer network such as the Internet. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

A computer network in a distributed computing system can be conceptually divided into an overlay network implemented over an underlay network. An "overlay network" generally refers to an abstracted network implemented over and operating on top of an underlay network. The underlay network can include multiple physical network devices interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can have one or more tenant end points ("TEPs"), for example, virtual machines. The virtual networks can interconnect multiple TEPs on different servers. Virtual network devices in the overlay network can be connected to one another by virtual links individually corresponding to one or more network routes along one or more physical network devices in the underlay network.

Large distributed computing systems, such as datacenters, can have thousands or even millions of servers individually hosting one or more virtual machines for providing cloud or other computing services to users. Typically, computing capacities of datacenters can be sized to accommodate peak loads of usage demand. However, datacenters typically operate at normal loads that are much less than peak loads. As such, the extra computing capacity in datacenters can stay idle most of the time and thus becoming a waste. To improve utilization of computing capacities in datacenters, servers and associated power distribution units, transformers, circuit breakers, and/or other electrical components may be oversubscribed such that the datacenters can support simultaneous usage demand from some users but not all users.

The foregoing oversubscription technique, however, involve risks of service interruptions when datacenters experience peak loads of usage demand. To accommodate peak loads of usage demand, datacenters can limit power consumption and/or performance of existing servers (commonly referred to as "throttling"). Throttling servers, however, can degrade user experience of certain computing services provided by the servers. In datacenters, a server can typically host multiple virtual machines executing different processes corresponding to different users simultaneously. Some users may have higher service level guaranties such as lower latency, higher service availability, etc., of computing services than others. Throttling an entire server can thus indiscriminately reduce performance of computing services provided by the server to all users, and thus violate service level guaranties of some users.

Also, some processes can be more sensitive to throttling than others with respect to user experience. On a server, some virtual machines can execute processes for video streaming, voice-over-IP conferencing, web-based collaboration, or other types of client facing services. Other virtual machines can execute other processes to provide virus scanning, software patching, software maintenance, or other background services. Client facing services can be more sensitive to throttling than background services because the effects of throttling the background services may not be as noticeable to users as throttling the client facing services. As such, throttling an entire server may needlessly degrade user experience of the computing services provided by the server.

Several embodiments of the disclosed technology can address certain aspects of the foregoing difficulties by implementing a processor controller that is configured to dynamically adjust operating parameters of physical processors on a server based on profiles of virtual machines whose processes the physical processors are assigned to execute. For example, upon detecting that a process corresponding to a virtual machine hosted on a server is assigned and scheduled to be executed by one or more processors of the CPU of the server, the processor controller can be configured to determine an operating parameter to be set for executing any processes for the virtual machine with the CPU. The processor controller can then be configured to program one or more processors of the CPU according to the operating parameter in the accessed parameter record. Upon completion of programing the one or more processors, the process corresponding to the virtual machine can be executed with the programmed one or more processors. As such, a target power consumption or performance level associated with the virtual machine can be achieved, as described in more detail below with reference to FIGS. 1-7.

FIG. 1 is a schematic diagram illustrating a computing system 100 having hosts implementing network traffic management techniques in accordance with embodiments of the disclosed technology. As shown in FIG. 1, the distributed computing system 100 can include a computer network (shown as an "underlay network 108") interconnecting a plurality of servers 106, a plurality of client devices 102 of users 101, and a system controller 110 to one another. The system controller 110 can be a cluster controller, a fabric controller, a database controller, and/or other suitable types of controller configured to monitor and manage operations of the servers 106. Even though particular components of the computing system 100 are shown in FIG. 1, in other embodiments, the computing system 100 can also include network storage devices, maintenance managers, and/or other suitable components (not shown) in addition to or in lieu of the components shown in FIG. 1.

As shown in FIG. 1, the underlay network 108 can include multiple network devices 112 that interconnect the multiple servers 106 and the client devices 102. In certain embodiments, the servers 106 can be organized into racks, action zones, groups, sets, or other suitable divisions. For example, in the illustrated embodiment, the servers 106 are grouped into three sets identified individually as first, second, and third host machine sets 107a-107c. In the illustrated embodiment, each of the host machine sets 107a-107c is operatively coupled to a corresponding network device 112a-112c, respectively, which are commonly referred to as "top-of-rack" or "TOR" network devices. The TOR network devices 112a-112c can then be operatively coupled to additional network devices 112 to form a network in a hierarchical, flat, mesh, or other suitable types of topology. The computer network can allow communications among the servers 106 and the client devices 102. In other embodiments, the multiple host machine sets 107a-107c can share a single network device 112 or can have other suitable arrangements.

The servers 106 can individually be configured to provide computing, storage, and/or other suitable cloud computing services to the individual users 101. For example, as described in more detail below with reference to FIG. 2, each of the servers 106 can initiate and maintain one or more virtual machines 144 (shown in FIG. 2) upon requests from the users 101. The users 101 can then utilize the instantiated virtual machines 144 to execute suitable processes for performing computation, communication, and/or other suitable tasks. In certain embodiments, one of the servers 106 can provide virtual machines 144 for multiple users 101. In other embodiments, multiple servers 106 can host virtual machines 144 for one or more users 101a-101c.

The client devices 102 can each include a computing device that facilitates corresponding users 101 to access computing services provided by the servers 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the servers 106.

Figure 2:
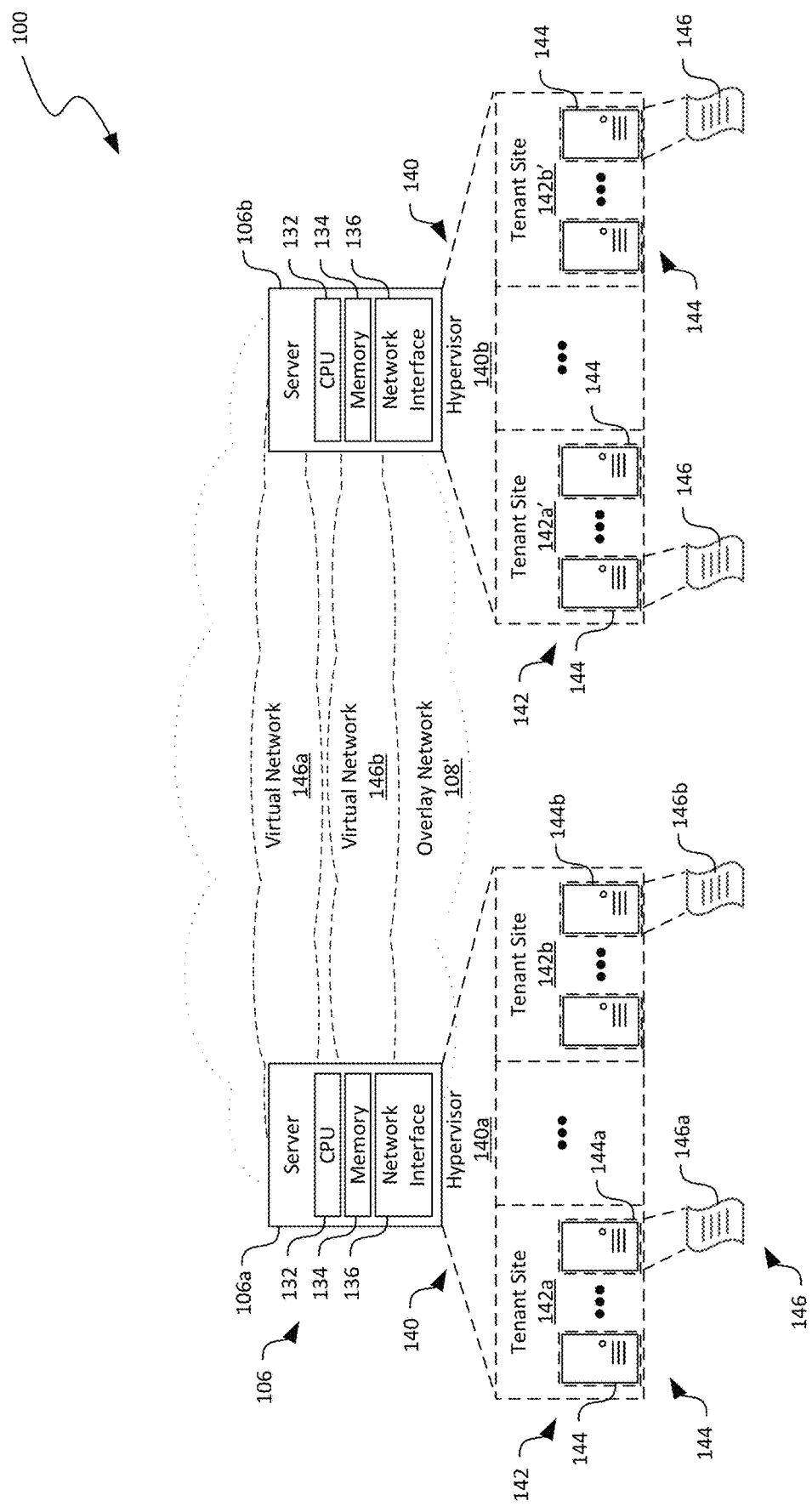
FIG. 2 is a schematic diagram illustrating certain hardware/software components of the computing system of FIG. 1 in accordance with embodiments of the disclosed technology.

FIG. 2 is a schematic diagram illustrating an overlay network 108' that can be implemented on the underlay network 108 in FIG. 1 in accordance with embodiments of the disclosed technology. In FIG. 2, only certain components of the underlay network 108 of FIG. 1 are shown for clarity. As shown in FIG. 2, the first server 106a and the second server 106b can each include a CPU 132, a memory 134, and a network interface 136 operatively coupled to one another. The CPU 132 can include one or more processors, microprocessors, field-programmable gate arrays, and/or other suitable logic devices. Detailed examples of the CPU 132 are described below with reference to FIGS. 3A-3F. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the CPU 132 (e.g., instructions for performing the methods discussed below with reference to FIGS. 6A and 6B). The network interface 136 can include a network interface card, a connection converter, and/or other suitable types of input/output devices configured to accept input from and provide output to other components on the overlay networks 108'.

The first server 106a and the second server 106b can individually contain instructions in the memory 134 executable by the CPU 132 to cause the individual servers 106a and 106b to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first server 106a can provide a first hypervisor 140a that manages first and second tenant sites 142a and 142b, respectively. The second server 106b can provide a second hypervisor 140b that manages first and second tenant sites 142a' and 142b', respectively. The hypervisors 140 are individually shown in FIG. 2 as software components. However, in other embodiments, the hypervisors 140 can also include firmware and/or hardware components.

The tenant sites 142 can each include multiple virtual machines 144 for a particular user 101 (FIG. 1). For example, the first server 106a and the second server 106b can both host the tenant site 142a and 142a' for a first user 101a (FIG. 1). The first server 106a and the second server 106b can both host the tenant site 142b and 142b' for a second user 101b (FIG. 1). Each virtual machine 144 can be executing processes 146 corresponding to an operating system, middleware, and/or suitable applications. The executed processes 146 can each correspond to one or more computing services or other suitable types of computing services.

Also shown in FIG. 2, the computing system 100 can include an overlay network 108' having one or more virtual networks 146 that interconnect the tenant sites 142a and 142b across the first and second servers 106a and 106b. For example, a first virtual network 142a interconnects the first tenant sites 142a and 142a' at the first server 106a and the second server 106b. A second virtual network 146b interconnects the second tenant sites 142b and 142b' at the first server 106a and the second server 106b. Even though a single virtual network 146 is shown as corresponding to one tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different servers 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses.

In operation, the servers 106 can facilitate communications among the virtual machines and/or applications executing in the virtual machines 144. For example, the CPU 132 can execute suitable network communication operations to facilitate the first virtual machine 144' to transmit packets to the second virtual machine 144" via the virtual network 146a by traversing the network interface 136 on the first server 106a, the underlay network 108 (FIG. 1), and the network interface 136 on the second server 106b. In accordance with embodiments of the disclosed technology, the hypervisors 140 can be implemented with a processor controller that is configured to dynamically adjust operating parameters of processors of the CPU 132 based on profiles of virtual machines 144 whose processes 146 the processors are assigned to execute, as described in more detail below with reference to FIGS. 3A-3F.

FIGS. 3A-3F are schematic block diagrams of a server 106 suitable for the computing system 100 of FIG. 1 at various operational stages during virtual machine operation management in accordance with embodiments of the present technology. In FIGS. 3A-3F and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

Figure 3A:
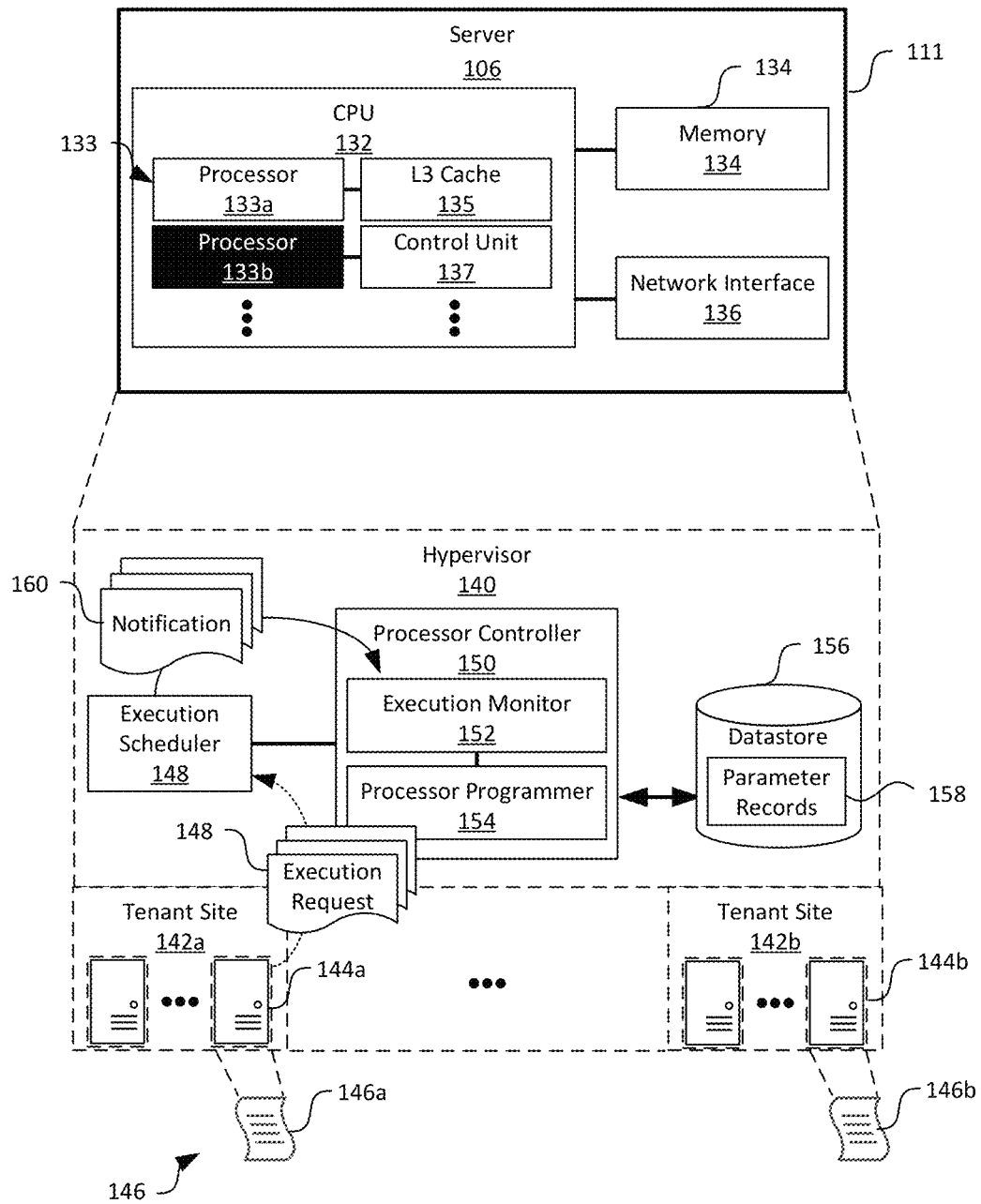
FIGS. 3A-3F are schematic block diagrams of a server suitable for the computing system of FIG. 1 at various operational stages during virtual machine operation management in accordance with embodiments of the present technology.

As shown in FIG. 3A, the server 106 can include a motherboard 111 carrying a CPU 132, a memory 134, and a network interface 135 operatively coupled to one another. Though not shown in FIGS. 3A-3F, in other embodiments, the server 106 can also include a memory controller, a persistent storage, an auxiliary power source, a baseboard management controller operatively coupled to one another. In certain embodiments, the motherboard 111 can include a printed circuit board with one or more sockets configured to receive the foregoing or other suitable components described herein. In other embodiments, the motherboard 111 can also carry indicators (e.g., light emitting diodes), platform controller hubs, complex programmable logic devices, and/or other suitable mechanical and/or electric components in lieu of or in addition to the components shown in FIGS. 3A-3F.

The CPU 132 can include an electronic package containing various components configured to perform arithmetic, logical, control, and/or input/output operations. The CPU 132 can be configured to execute instructions of processes 146 to provide suitable computing services, for example, in response to a user request received from the client device 102 (FIG. 1). As shown in FIG. 3A, the CPU 132 can include one or more physical processors or "cores" 133 configured to execute instructions independently or in other suitable manners. Two physical processors 133 (illustrated individually as first and second physical processors 133a and 133b, respectively) are shown in FIG. 3A for illustration purposes. In other embodiments, the CPU 132 can include four, eight, sixteen, thirty-two, or any other suitable number of physical processors 133. The physical processors 133 can individually include one or more arithmetic logic units, floating-point units, L1 and L2 cache, and/or other suitable components. As shown in FIG. 3A, the CPU 132 can also include one or more peripheral components configured to facilitate operations of the physical processors 133. The peripheral components can include, for example, L3 cache 135, a control unit 135, and/or other suitable modules.

The memory 134 can include a digital storage circuit directly accessible by the CPU 132 via, for example, a data bus (not shown). In one embodiment, the data bus can include an inter-integrated circuit bus or I²C bus as detailed by NXP Semiconductors N.V. of Eindhoven, the Netherlands. In other embodiments, the data bus can also include a PCIe bus, system management bus, RS-232, small computer system interface bus, or other suitable types of control and/or communications bus. In certain embodiments, the memory 134 can include one or more DRAM modules. In other embodiments, the memory 134 can also include magnetic core memory or other suitable types of memory.

As shown in FIG. 3A, the CPU 132 can cooperate with the memory 134 to execute suitable instructions to provide a hypervisor 140 and one or more virtual machines 144 managed by the hypervisor 140. In FIG. 3A, four virtual machines 144 are shown for illustration purposes. In other embodiments, the server 106 can be configured to provide one, two, three, or any other suitable number of virtual machines 144. The individual virtual machines 144 can be accessible to the users 101 (FIG. 1) via the overlay and underlay network 108' and 108 (FIGS. 1 and 2) for executing suitable processes 146. For example, as shown in FIG. 3A, the first virtual machine 144a can be configured to execute a first process 146a while the second virtual machine 144b can be configured to execute a second process 146b.

To facilitate operation management of the virtual machines 144, the hypervisor 140 can be configured to implement a processor controller 150 operatively coupled to an execution scheduler 148 and a datastore 156 containing data representing parameter records 158 corresponding to the virtual machines 144. In the illustrated embodiment, the execution scheduler 148 and the processor controller 150 are shown as components of the hypervisor 140. In other embodiments, the execution scheduler 148 and/or the processor controller 150 can each be a component of an operating system on the server 106, a standalone application, and/or have other suitable configurations. For example, the execution scheduler 148 can include a processor scheduler, a dispatcher, or other suitable modules of the operating system (not shown) on the server 106.

The execution scheduler 148 can be configured to assign and schedule execution of different processes 146 by different physical processors 133 of the CPU 132. For example, as shown in FIG. 3A, upon receiving an execution request 148 from the first virtual machine 144a, the execution scheduler 148 can assign one of the physical processors 133 (e.g., the second processor 133b shown in FIG. 3A in reverse contrast) to execute the first process 146a of the first virtual machine 144a by, for instance, adding the first process 146a to an execution queue (not shown) of the second processor 133b or via other suitable techniques. Upon scheduling execution of the first process 146a, the execution scheduler 148 can be configured to transmit a notification 160 to the processor controller 150. The notification 160 indicating to the processor controller 150 that the first task 146a has been scheduled for execution by the second processor 133b. In response, the processor controller 150 can be configured to dynamically adjust operating parameters of second processor 133b of the CPU 132 based on profiles of first virtual machines 144a, as described in more detail below.

Figure 3B:
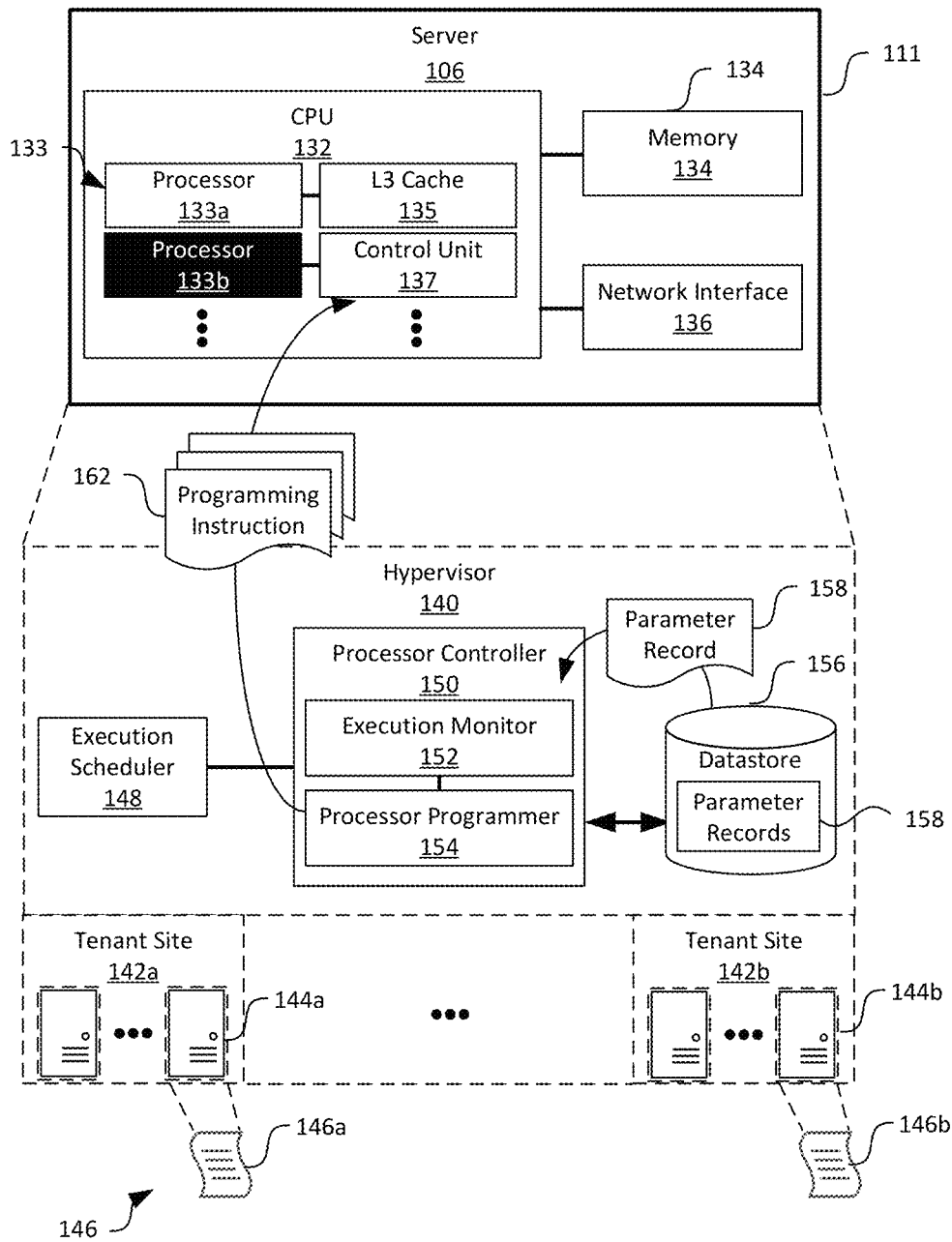

As shown in FIG. 3A, the processor controller 150 can include an execution monitor 152 and a processor programmer 154 operatively coupled to each other. Though particular components of the processor controller 150 are shown in FIG. 3A, in other embodiments, the processor controller 150 can also include additional and/or different components. The execution monitor 152 can be configured to receive the notification 160 from an execution scheduler 148 in the hypervisor 140 indicating that the first process 146a is assigned to be executed by the second processor 133b for the first virtual machine 144a. Upon receiving the notification 160, the execution monitor 152 can be configured to retrieve, for instance from the datastore 156, a parameter record 158 corresponding to the first virtual machine 144a whose first process 146a is to be executed by the second processor 133b, as shown in FIG. 3B.

The parameter record 158 can include data indicating a power consumption level, an operating frequency, a clock speed, a L1/L2/L3 level cache usage, floating point operations per second, or other suitable operating parameters corresponding to the first virtual machine 144a. In certain implementations, a VM analyzer 170 (shown in FIG. 4) that is separate from the processor controller 150 can be configured to generate the parameter record 158 based on, inter alia, VM data 172 (shown in FIG. 4) of the first virtual machine 144a and system data 174 (shown in FIG. 4) of the server 106. Example VM data 172 can include a service level agreement or a subscription level of a user 101 (FIG. 1) corresponding to the first virtual machine 144a, a priority of the first virtual machine 144a, whether the first process 146a is configured to provide a client facing service or background service, or other suitable information. Example server data 174 can include a type/model of the physical processors 133, operating frequencies of the physical processors 133, available L1/L2/L3 level cache on the processors 133, and/or other information regarding the physical processors 133 and other components on the CPU 132. In other implementations, the VM analyzer 170 can be incorporated into the processor controller 150 and be configured to generate the parameter record 158 on an ad hoc or other suitable basis. In further implementations, the parameter record 158 can be generated via machine learning, manual configuration, and/or other suitable techniques. Upon receiving the parameter record 158 corresponding to the first virtual machine 144a, the execution monitor 152 can then provide the data in the received parameter record 158 to the processor programmer 154 and instruct the processor programmer 154 to adjust operating parameters of the second processor 133b assigned to execute the first process 146a accordingly.

Figure 3C:
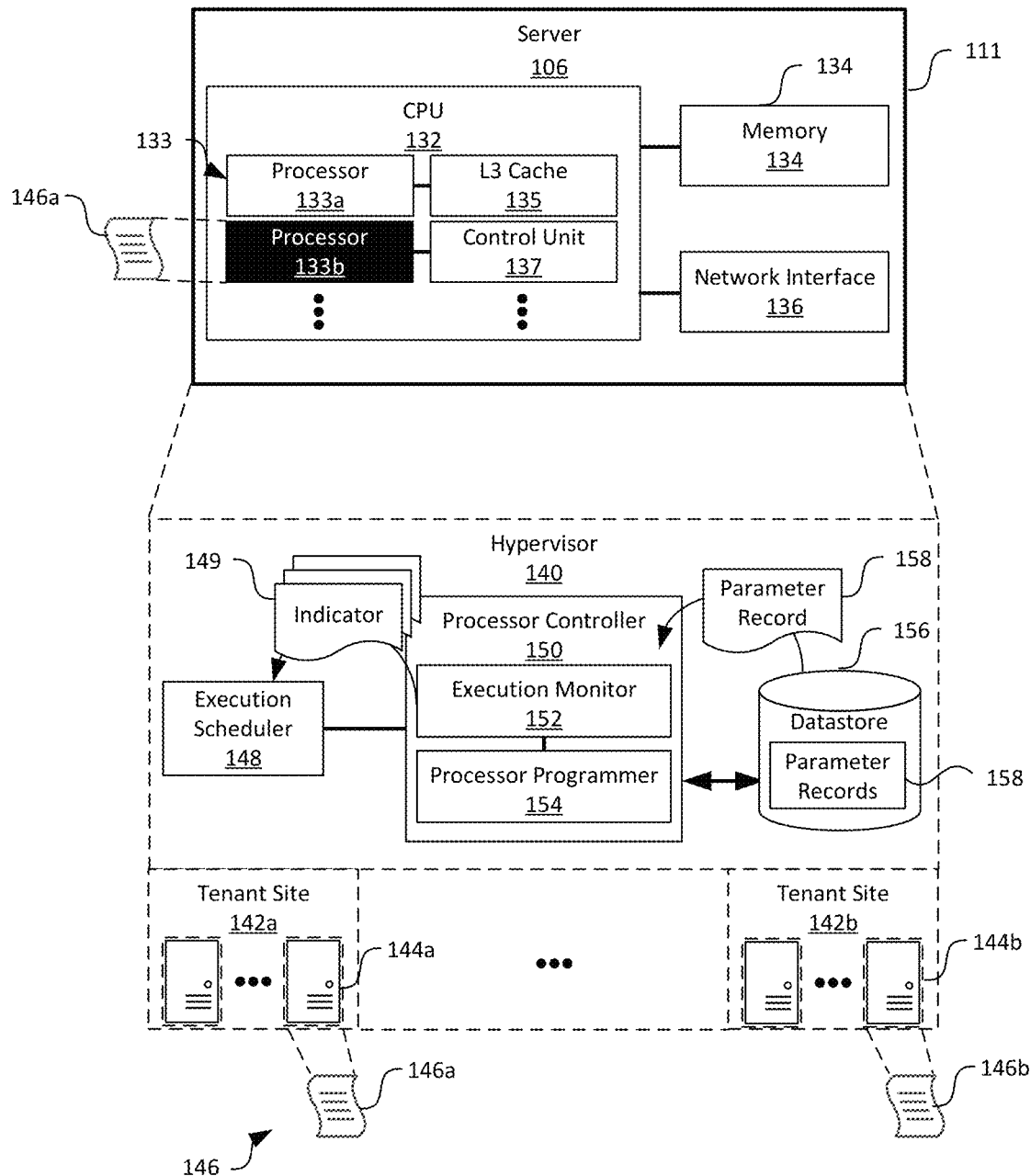

In response to receiving the instruction from the execution monitor 152, the processor programmer 154 can be configured to program the assigned second processor 133b based on data in the retrieved parameter record 158. In one implementation, as shown in FIG. 3B, the processor programmer 154 can be configured to transmit a programming instruction to the control unit ("CU") 137 of the CPU 132 with a suitable command to set an operating parameter of the second processor 133b. For example, the processor programmer 154 can transmit a command to increase or decrease an operating frequency of the second processor 133b to a preset level. In turn, the control unit 137 can direct operation of the second processor 133b by, for instance, controlling an arithmetic and logic unit, data input/output, and/or other components on or external to the second processor 133b how to respond to instructions of the first process 146a sent to the second processor 133b. Upon completion of programing the assigned second processor 133b, the processor programmer 154 can transmit an indicator 149 to the execution scheduler 148, the operating system, the control unit 137 of the CPU 132, or other suitable components of the server 106 to initiate execution of the process by the second processor 133b for the first virtual machine 144a, as shown in FIG. 3C.

Figure 3D:
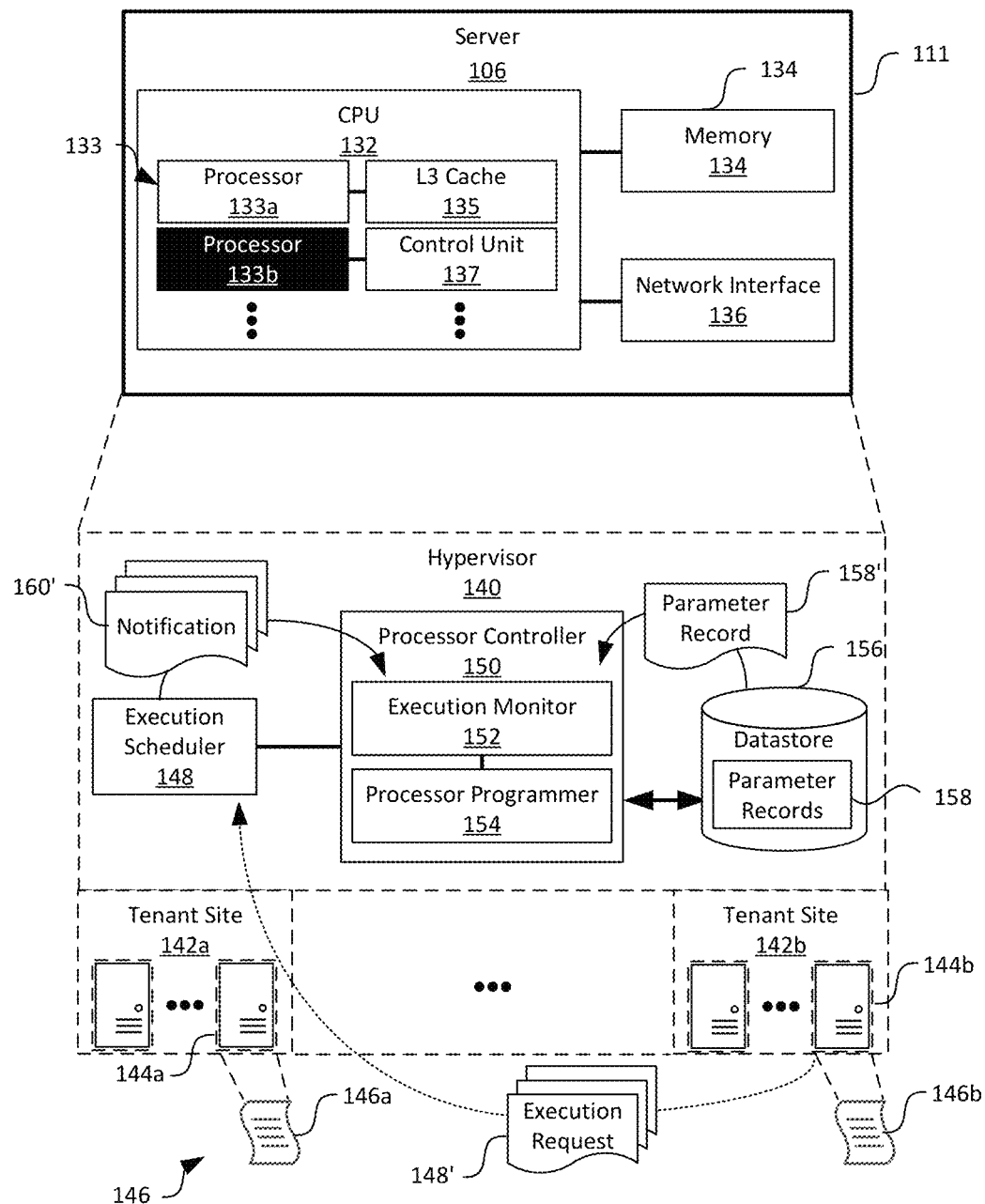
Figure 3E:
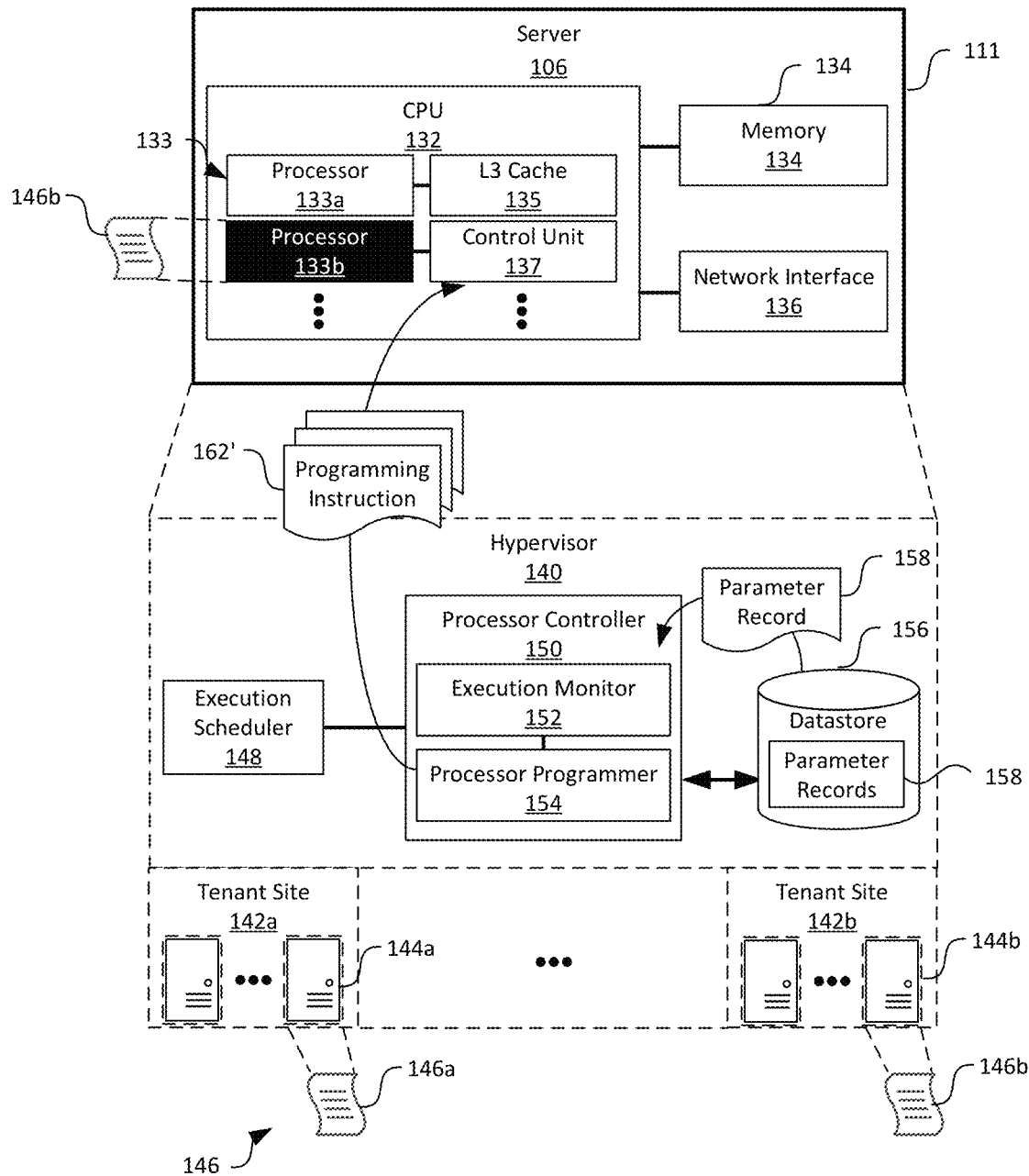

As shown in FIG. 3D, subsequent to executing the first process 146a by the second processor 133b for the first virtual machine 144a, the execution monitor 152 can be configured to receive a new notification 160' from the execution scheduler 148 regarding a new process (e.g., the second process 146b) to be assigned to the second processor 133b for execution for the second virtual machine 144b on the server 106. In response, the execution monitor 152 can be configured to retrieve a new parameter record 158' corresponding to the second virtual machine 144b. As shown in FIG. 3E, the processor programmer 154 can then be configured to instruct the control unit 137 to reprogram the second processor 133b, for example, by transmitting another programming instruction 162', before allowing execution of the second process 146b by the second processor 133b. As such, the same second processor 133b can be operating at different performance, power, or other suitable types of operating levels at different times in accordance with the profiles of different virtual machines 144 for executing processes 146 of the different virtual machines 144.

Figure 3F:
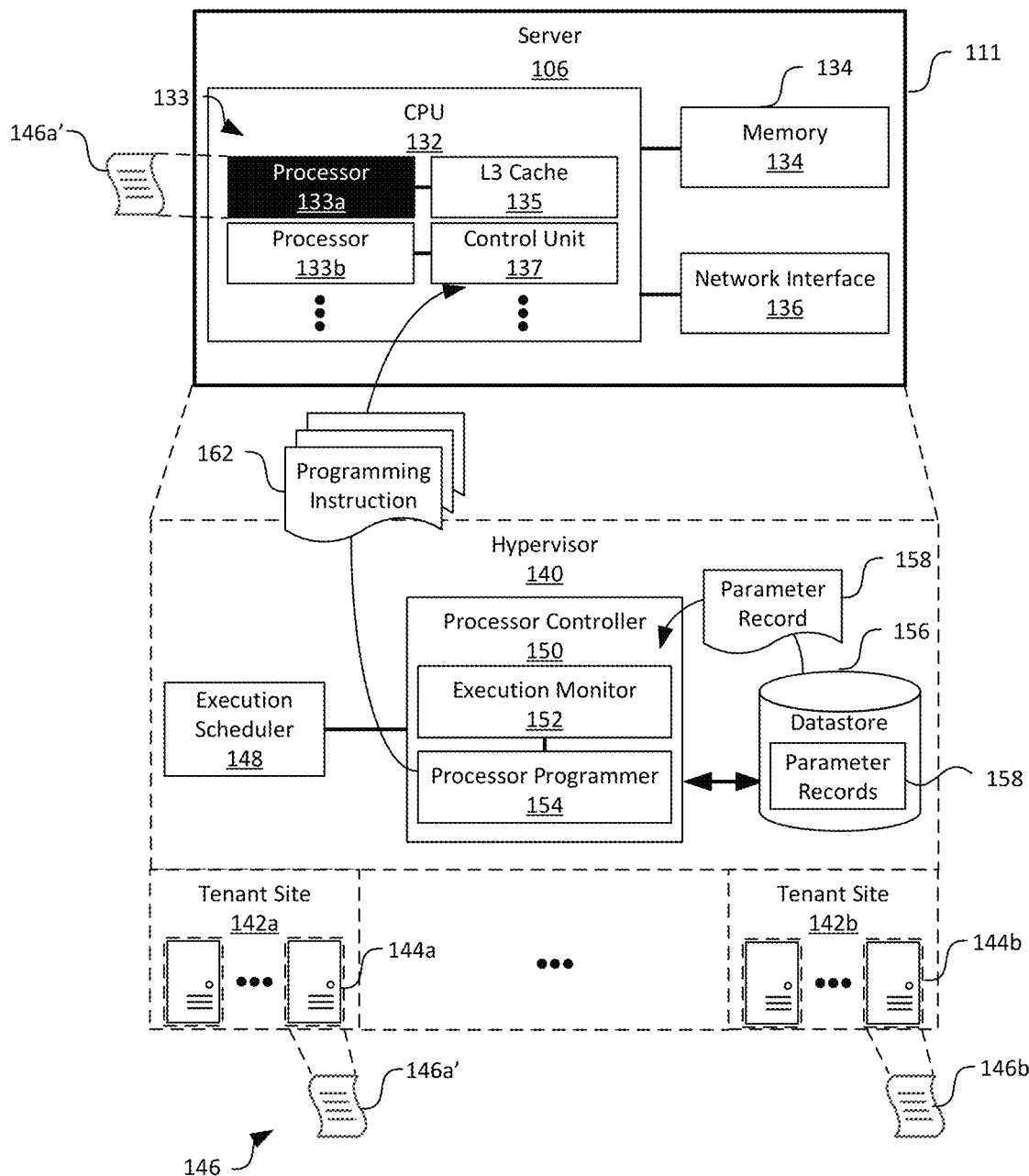

Alternately, as shown in FIG. 3F, subsequent to executing the first process 146a (FIG. 3D) by the second processor 133b for the first virtual machine 144a, the execution monitor 152 can be configured to receive a new notification (not shown) from the execution scheduler 148 regarding the same or a new first process 146a' to be assigned to another physical processor 133 (e.g., the first processor 133a) for execution for the same first virtual machine 144a on the server 106. In response, the execution monitor 152 can be configured to retrieve the same parameter record 158 corresponding to the first virtual machine 144a and instruct the processor programmer 154 to program the first processor 133a accordingly before allowing execution of the same or new first process 146a' on the first processor 133a. As such, execution of the first processes 146 for the same first virtual machine 144a can be at a corresponding performance, power, or other suitable types of operating level at different times in accordance with the profiles of first virtual machine 144a.

Several embodiments of the disclosed technology can thus effectively achieve performance and/or power consumption control of the virtual machines 144 on the server 106. By programming the individual physical processors 133 with operating parameters corresponding to one of the virtual machines 144 whose process 146 is to be executed by the physical processor 133, power consumption and/or computing performance of the individual virtual machines 144 can be controlled at target levels. In some scenarios, the server 106 can allow all virtual machines 144 to operate at full performance and/or power levels with the physical processors 133 until the server 106 received a notification (not shown) to throttle power consumption and/or performance from the system controller (FIG. 1). In response, the server 106 can throttle execution of processes 146 for some virtual machines 144 based on corresponding parameter records 158 but not others. As such, by preferentially throttling power consumption and/or performance of different virtual machines 144, processes 146 for client facing services may be preferentially executed to reduce noticeable service interruption to users 101 (FIG. 1). As a result, user experience of computing services provided by the server 106 may be improved. In other scenarios, the server 106 can be configured to throttle select virtual machines 144 based on service level agreements, priorities, or other suitable profiles of corresponding users 101 in addition to or in lieu of the notification to throttle from the system controller 110.

Figures 4, 5:
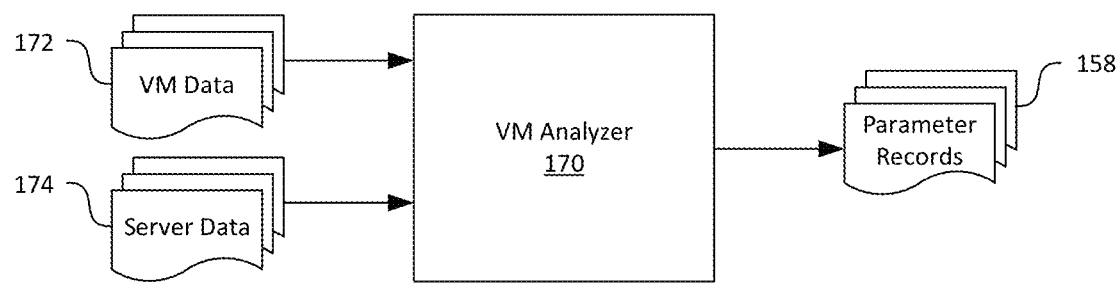
FIG. 4 is a schematic diagram illustrating a VM analyzer configured to facilitate virtual machine operation management in accordance with embodiments of the disclosed technology.
FIG. 5 is an example data schema suitable for a parameter record in accordance with embodiments of the present technology.

FIG. 4 is a schematic diagram illustrating a VM analyzer 170 configured to facilitate virtual machine operation management in accordance with embodiments of the disclosed technology. In certain embodiments, the VM analyzer 170 can be implemented as a computing service hosted on one or more of the servers 106 (FIG. 1) in the distributed computing system 100 (FIG. 1). In other embodiments, the VM analyzer 170 can be implemented as a standalone computing device, incorporated into the processor controller 150 (FIG. 3A), or have other suitable configurations.

The VM analyzer 170 can be configured to generate parameter records 158 corresponding to virtual machines 144 (FIG. 2) hosted on a server 106 based on VM data 172 and server data 174. In certain embodiments, the VM analyzer 170 can implement certain rules configured by, for instance, an administrator of the distributed computing system 100. Example rules can include, for instance, if a virtual machine 144 corresponds to a user 101 with a high subscription level, set a power consumption or performance of a physical processor 133 executing any processes for the virtual machine at a threshold level higher than for other users 101 with lower subscription levels. In another example, if a process corresponds to a client facing service, another rule can indicate that a power consumption or performance of a physical processor 133 executing the process can be set at a threshold level that is higher than another process corresponding to a background service. In other embodiments, the VM analyzer 170 can also implement rules developed via machine learning and/or via other suitable techniques.

FIG. 5 is an example data schema 180 suitable for a parameter record 158 of FIGS. 3A-3F in accordance with embodiments of the present technology. As shown in FIG. 5, the data schema 180 can include a VM ID field 182, a power field 184, a frequency field 186, and a last updated field 188. In other embodiments, the data schema 180 can include other suitable fields in addition to or in lieu of those shown in FIG. 5.

The VM ID field 182 can be configured to contain data representing a corresponding virtual machine 144 (FIG. 2). Examples of such data can include alphanumerical, numerical, and/or other suitable types of string. The power field 184 can be configured to contain data representing a power consumption limit for a physical processor 133 (FIG. 3A) when executing processes for the virtual machine 144. The frequency field 186 can be configured to contain data representing a frequency for a physical processor 133 when executing processes for the virtual machine 144. The last updated field 188 can contain data representing a date/time that the parameter record 158 is last updated.

Figure 6A:
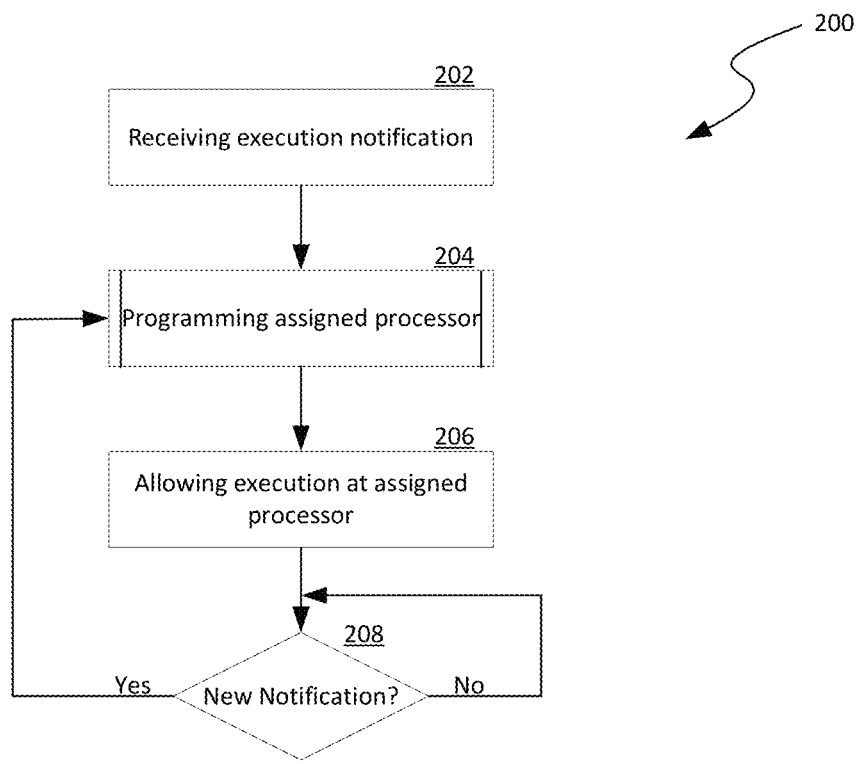
FIGS. 6A and 6B are flow diagrams illustrating aspects of processes for virtual machine operation management in accordance with embodiments of the present technology.
Figure 6B:
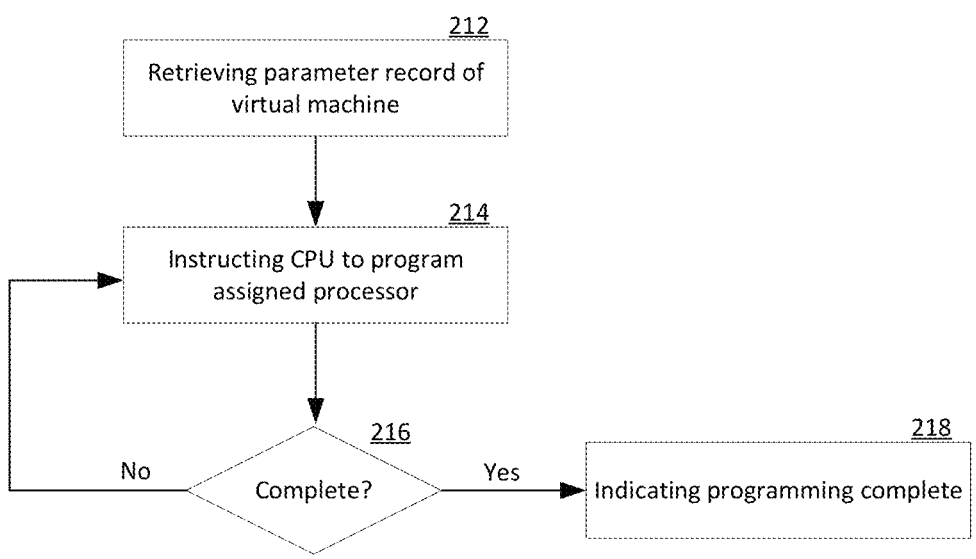

FIGS. 6A and 6B are flow diagrams illustrating aspects of processes for virtual machine operation management in accordance with embodiments of the present technology. Though embodiments of the processes are described below in the context of the distributed computing system 100, in other embodiments, the processes may be implemented in other computing systems with additional and/or different components.

As shown in FIG. 6A, a process 200 can include receiving an execution notification at stage 202. The execution notification can indicate that a process is scheduled to be executed by a physical processor of a CPU on a server, as described in more detail above with reference to FIG. 3A. The process 200 can then include programming the assigned physical processor at stage 204. Example operations of programming the assigned physical processor are described in more detail with reference to FIGS. 3A-3C and FIG. 6B below. The process 200 can then include allowing execution of the process by the assigned physical processor at stage 206, are described in more detail with reference to FIG. 3D. The process 200 can then include a decision stage 208 to determine whether a new notification is received. In response to determining that a new notification is received, the process 200 reverts to programming or reprogramming a physical processor at stage 204, as described in more detail above with reference to FIGS. 3D-3F. In response to determining that a new notification is not received, the process 200 includes continuing to monitor for new notifications at stage 208.

As shown in FIG. 6B, example operations of programing a physical processor can include retrieving a parameter record corresponding to the virtual machine at stage 212. The operations can then include instructing the CPU to program the assigned physical processor according to data included in the retrieved parameter record at stage 214. The operations can then include a decision stage 216 to determine whether programming of the assigned physical processor is competed. In response to determining that programming of the assigned physical processor is compete, the operations include indicating that programming is complete at stage 218. In response to determining that programming of the assigned physical processor is not compete, the revert to instructing the CPU to program the physical processor at stage 218.

Figure 7:
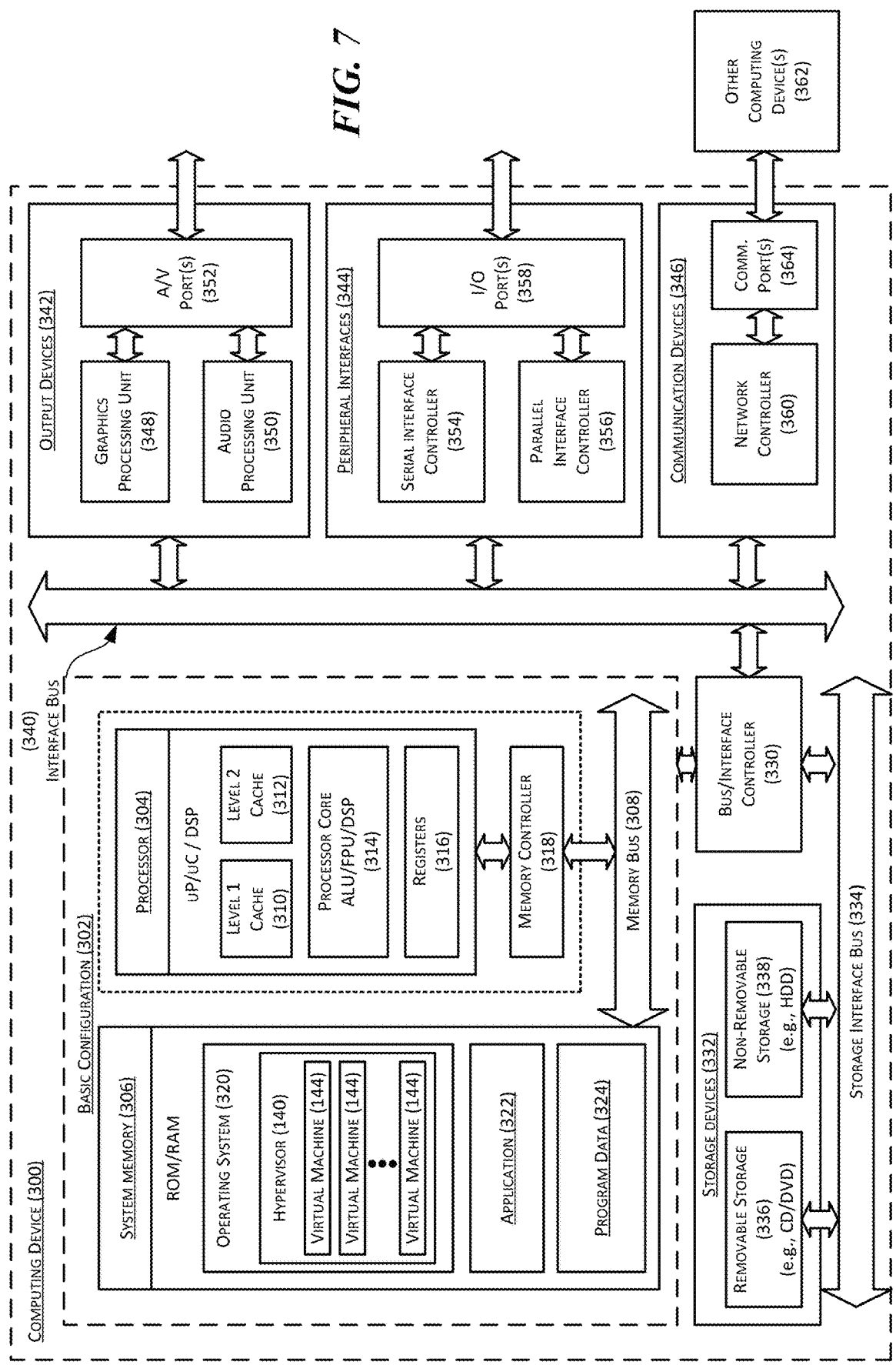
FIG. 7 is a computing device suitable for certain components of the computing system in FIG. 1.

FIG. 7 is a computing device 300 suitable for certain components of the distributed computing system 100 in FIG. 1, for example, the server 106, the client device 102, or the system controller 110. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 7, the operating system 320 can include a hypervisor 140 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless webwatch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of operation management in a computing device having multiple processors, the method comprising:
retrieving a first operating parameter associated with a first process, the first operating parameter associated with a first performance level for a first virtual resource;
programming the processor according to the first operating parameter;
executing the first process using the processor programmed according to the first operating parameter;
retrieving a second operating parameter associated with a second process, the second operating parameter associated with a second performance level for a second virtual resource;
after the first process is executed, reprogramming the processor according to the second operating parameter such that the processor is no longer programmed according to the first operating parameter; and
executing the second process using the processor reprogrammed according to the second operating parameter.

2. The method of claim 1, wherein the first virtual resource and the second virtual resource comprise virtual machines.

3. The method of claim 1, wherein:
the first virtual resource is associated with a first priority that is higher than a second priority associated with the second virtual resource; and
the first performance level is more performant than the second performance level based on the first priority being higher than the second priority.

4. The method of claim 1, wherein:
the first operating parameter is associated with a first service level agreement for the first virtual resource; and
the second operating parameter is associated with a second service level agreement for the second virtual resource.

5. The method of claim 1, wherein:
the first operating parameter is associated with a first operating power rating for the processor; and
the second operating parameter is associated with a second operating power rating for the processor.

6. The method of claim 1, wherein:
the first operating parameter is associated with a first operating frequency for the processor; and
the second operating parameter is associated with a second operating frequency rating for the processor.

7. The method of claim 1, wherein:
the first operating parameter indicates that the first process is a client facing process; and
the second operating parameter indicates that the second process is a background process.

8. The method of claim 1, wherein:
the first operating parameter indicates a first limit on power consumption for execution of the first process; and
the second operating parameter indicates a second limit on power, consumption for execution of the second process.

9. A computing device, comprising:
a central processing unit ("CPU") having multiple processors; and
computer readable storage media having instructions executable by the CPU to:
retrieve a first operating parameter associated with a first process, the first operating parameter associated with a first performance level for a first virtual resource;
program a processor of the multiple processors according to the first operating parameter;
execute, during a first time period, the first process using the processor programmed according to the first operating parameter;
after the first process is executed, retrieve a second operating parameter associated with a second process, the second operating parameter associated with a second performance level for a second virtual resource;
reprogram the processor according to the second operating parameter; and
execute, during a second time period after the first time period, the second process using the processor reprogrammed according to the second operating parameter.

10. The computing device of claim 9, wherein the first virtual resource and the second virtual resource comprise virtual machines.

11. The computing device of claim 9, wherein:
the first virtual resource is associated with a first priority that is higher than a second priority associated with the second virtual resource; and
the first performance level is more performant than the second performance level based on the first priority being higher than the second priority.

12. The computing device of claim 9, wherein:
the first operating parameter is associated with a first service level agreement for the first virtual resource; and
the second operating parameter is associated with a second service level agreement for the second virtual resource.

13. The computing device of claim 9, wherein:
the first operating parameter is associated with a first operating power rating for the processor; and
the second operating parameter is associated with a second operating power rating for the processor.

14. The computing device of claim 9, wherein:
the first operating parameter is associated with a first operating frequency for the processor; and
the second operating parameter is associated with a second operating frequency rating for the processor.

15. The computing device of claim 9, wherein:
the first operating parameter indicates that the first process is a client facing process; and
the second operating parameter indicates that the second process is a background process.

16. The computing device of claim 9, wherein:
the first operating parameter indicates a first limit on power consumption for execution of the first process; and
the second operating parameter indicates a second limit on power consumption for execution of the second process.

17. Computer readable storage media having instructions executable by a central processing unit ("CPU") having multiple processors to:
receive a notification indicating that a first process is scheduled to be executed by a processor of the multiple processors;
in response to receiving the notification, retrieve a first operating parameter associated with the first process, the first operating parameter associated with a first performance level for a first virtual resource;
program the processor according to the first operating parameter;
execute the first process using the processor programmed according to the first operating parameter;
receive another notification indicating that the second process is scheduled to be executed by the processor;
in response to receiving the other notification, retrieve the second operating parameter associated with the second process, the second operating parameter associated with a second performance level for a second virtual resource;
after the first process is executed, reprogram the processor according to the second operating parameter such that the processor is no longer programmed according to the first operating parameter; and
execute the second process using the processor reprogrammed according to the second operating parameter.

18. The computer readable storage media of claim 17, wherein:
the first operating parameter indicates a first limit on power consumption for execution of the first process; and
the second operating parameter indicates a second limit on power consumption for execution of the second process.

19. The computer readable storage media of claim 17, wherein:
the first virtual resource is associated with a first priority that is higher than a second priority associated with the second virtual resource; and
the first performance level is more performant than the second performance level based on the first priority being higher than the second priority.

20. The computer readable storage media of claim 17, wherein:
the first operating parameter is associated with a first service level agreement for the first virtual resource; and
the second operating parameter is associated with a second service level agreement for the second virtual resource.

* * * * *